Patented Feb. 15, 1949

2,461,563

UNITED STATES PATENT OFFICE 2,461,563

PROCESS FOR THE DEGRADATION OF THE SIDE-CHAIN OF STEROIDS AND STEROIDS SUITABLE THEREFOR

Karl Miescher, Riehen, Hugo Frey, Olten, and Charles Meystre and Albert Wettstein, Basel, Switzerland, assignors to Ciba Pharmaceutical Products, Incorporated, Summit, N. J., a corporation of New Jersey No Drawing. Application August 5, 1943, Serial No. 497,556. In Switzerland August 18, 1942

23 Claims. (Cl. 260—397.1)

A number of methods for the degradation of the side-chain of steroids are already known. For instance, the gradual degradation of bile acids by Wieland's or Curtius' method is widely used, which methods have to be repeated several times, as only one carbon atom is removed at a time. These processes are therefore very tedious and expensive and, in addition, only give very moderate yields. The radical oxidation of sterols with chromic acid is simpler. But in this case too, only a little part of the parent product is converted into compounds with a largely or completely degraded side-chain. To a considerable extent the side-chain is only insufficiently degraded e. g. down to the stage of nor-cholestane-25-one or of cholanic acid, or the nucleus is split up under the vigorous conditions of the reaction. If the partly degraded products of the reaction are again strongly oxidized, the total yield decreases quite considerably, calculated on the amount of the twice oxidized parent substance. This is all the more pronounced as compounds of the cholanic acid series give worse results on vigorous oxidation, than the sterols. Finally many steroids, substituted in the nucleus in a special way, only occur in nature in the form of the cholanic acids and not as the corresponding sterols. For these reasons, a process which allows compounds of the cholanic acid or the nor-cholestane-25-one series to be degraded to a considerable degree with a good yield and in a clear and easy manner, represents a considerable advance.

A process for the degradation of the side-chain of steroids has now been found which makes possible the removal of at least three of the carbon atoms originally contained. The process comprises causing ring-saturated or ring-unsaturated steroids which contain in 17-position a substituent.

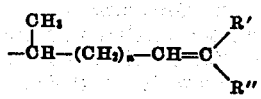

wherein R' and R" represent hydrogen, an aliphatic, aromatic or hydroaromatic radical, and $n$ means the number 1 or 2, if necessary with temporary protection of nuclear double bonds and sensitive substituents, to react with carboxylic acid imides, amides or arylamides which are substituted by halogen at the nitrogen atom, subsequently treating the products obtained with agents capable of eliminating hydrogen halide (any ammonium compounds, acyloxy derivatives or ethers intermediately produced being subjected to heat), and finally splitting up the newly formed conjugated double bond by means of oxidizing agents, if necessary, with temporary protection of nuclear double bonds and sensitive substituents.

The starting materials for the new process can be prepared, for example, from functional derivatives such as esters, halides or anhydrides of steriod carboxylic acids, which contain in the 17-position the radical $$-\overset{\mathrm{CH_3}}{\underset{|}{\mathrm{CH}}}-\mathrm{CH_2}-\mathrm{CH_2}-\mathrm{COOH}$$

or from steroid ketones which contain the side-chain $$-\overset{\mathrm{CH_3}}{\underset{|}{\mathrm{CH}}}-\mathrm{CH_2}-\mathrm{CH_2}-\mathrm{CH_2}-\mathrm{CO}-\mathrm{CH_3}$$

by known methods. Examples of such acids are, in particular, cholic acid, desoxycholic acid, chenodesoxycholic acid, hyodesoxycholic acid, lithocholic acid, cholanic acid, allo-cholanic acid, urso-cholanic acid, Δ⁵-3-hydroxy-cholenic acid, Δ⁷-3,12-dihydroxy-cholenic acid and apocholic acid; examples of ketones are nor-cholestane-3-ol-25-one and Δ⁵-nor-cholestene-3-ol-25-one. In addition to the acids and ketones mentioned, there may be used starting materials derived from corresponding derivatives, substitution or conversion products containing any substituents, particularly keto-groups; also those derived from the next higher homologues of the acids and the next lower homologues of the ketones mentioned. Such carboxylic acid derivatives or ketones can be caused to react with organic compounds of magnesium or other metals, e. g. methyl, ethyl or phenyl magnesium halides, and water can be eliminated directly or indirectly from the tertiary carbinols obtained. In addition to the ethylene compounds produced in the manner described, compounds of the type of dehydro-nor-cholene (see, Wieland and co-workers, Zeitschrift für physiologische Chemie, 150, page 273 [1925]; ibid., 186, page 229 [1930]) are suitable for use as starting materials. In these compounds the group

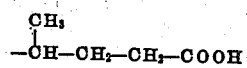

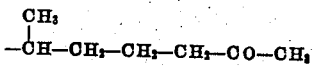

is represented by the carbon atom 12 and the residual cyclopentanopolyhydrophenanthrene structure.

In the first stage, derivatives of imides of dicarboxylic acids which are substituted by halogen (e. g. bromine or chlorine) at the nitrogen atom, are caused to act on the parent materials; as examples of such derivatives may be given N-halogen succinimides, phthalimides, parabanic acids, cyanuric acids, hydantoins or barbituric acids. In their stead corresponding derivatives of primary or secondary carboxylic acid amides, such as acetamide, propionamide or diacetamide, or of carboxylic acid arylamides, e. g. acetanilides and benzanilides halogenated or nitrated in the nucleus, may also be used. To carry out halogenation of the methylene group, which is present in the substituent mentioned in the α-position to the double bond, it is best to work in an inert solvent or diluent such as carbon tetrachloride, chloroform, benzene, cyclohexane, methylcyclohexane, ethyl ether or dioxane. To prevent side-reactions as well as possible, it is often advantageous to work in the dark.

Double bonds which may be present in the cyclopentanopolyhydrophenanthrene nucleus can be temporarily protected during halogenation in the usual way by saturation with halogen or hydrogen halide. The latter has the special advantage that the double bonds are regenerated in the next stage by means of basic reagents. Finally, substituents which are sensitive to halogenating agents may be advantageously protected temporarily, particularly free hydroxyl groups, for example by esterification or etherification. The esters with aromatic acids such as benzoic acid are, in contrast to the free hydroxyl compounds, very stable to the above halogenating agents; the esters with aliphatic acids are also generally attacked more slowly than the active methylene groups. Free keto groups also react considerably more slowly and hardly need to be protected. If necessary they can be converted into acetals, in particular of glycols. Free carboxyl groups do not react in general and therefore generally do not need special protection.

The halogenated products are treated, either in the crude form or after purification, with agents capable of eliminating hydrogen halide, e. g. with basic agents, for instance tertiary amines such as pyridine, collidine, quinoline or dimethylaniline, with alkaline or alkaline earth hydroxides or carbonates; instead of them also carboxylic acid salts such as the alkali or silver salts of fatty acids or even alcohols or phenols may be used. According to the reagents used and the conditions of the reaction, the reactive halogen is directly eliminated in the form of hydrogen halide and/or there are formed ammonium halides by the action of tertiary amines (e. g. pyridinium halides which, owing to their insolubility in ether, are easy to separate), acyloxy derivatives by the action of carboxylic acid salts, or ethers by the action of alcohols or phenols. Ammonium halides, ammonium bases obtained from them, acyloxy derivatives and ethers are subsequently advantageously decomposed by heat, preferably in a vacuum or in an inert gas, so that an elimination of hydrogen halide is produced in stages.

The conjugated double bond newly formed in the reaction products is then split up by direct or indirect oxidation in known manner. We mention, for example, oxidation by means of a compound of hexavalent chromium (such as chromic acid), permanganate, ozonization and splitting of the ozonides, the action of peroxides such as perbenzoic acid, monoperphthalic acid or hydrogen peroxide (preferably in the presence of osmium tetraoxide), and splitting (by means of, for example, chromic acid, lead tetra-acylates or periodic acid) of the glycols formed by hydrolysis of the oxide-ring or by direct addition of two hydroxyl groups to each of the double bonds.

During the oxidation, the double bonds contained in the cyclopentanopolyhydrophenanthrene nucleus may also be temporarily protected, for example, by addition and subsequent elimination of halogen or hydrogen halide, provided such protection is not made unnecessary by the special properties of the unsaturated system, such as, for example, a double bond with a keto group in the α-position. In addition, other sensitive substituents such as hydroxyl groups may be protected in known manner, e. g. by esterification or etherification and after exidation again liberated, if desired, partly or completely by hydrolysis. If, however, conversion of the nuclear hydroxyl groups to keto groups is desired, it can be carried out in known way, before, during or after oxidative cleavage of the conjugated double bond by the action of, in particular, oxidizing or dehydrogenating agents. Also chromic acid, permanganates, etc. are suitable oxidizing agents for this purpose; as dehydrogenating agents may be used, in particular, metal alcoholates or phenolates and carbonyl compounds (method of exchanging oxidation stages), or for example powdered metal by heating in a vacuum.

The products obtained by the new simple process, ketones, carboxylic acids or aldehydes can be saparated as usual and purified, for example, by recrystallization, chromatography, sublimation, reaction with keto reagents (particularly with those which give water-soluble condensation products), or by extraction with solutions of strong acids or their salts, or with basic reagents. They are themselves used for therapeutic purposes or may serve as intermediate products in the manufacture of medicaments.

The following examples illustrate the invention but are not to be regarded as limiting it in any way, the parts mentioned being by weight:

*Example 1*

10 parts of $\Delta^{23}$-3α, 12-diacetoxy-24,24-diphenyl-cholene are boiled under reflux for 15 minutes on a water-bath with 6 parts of N-bromosuccinimide in 50 parts of carbon tetrachloride. The cooled solution is filtered off from the mixture of the unchanged bromosuccinimide and succinimide, and washed with cold carbon tetrachloride. Twenty parts of pyridine are added to the filtrate, the whole heated for one hour on a water bath and then evaporated down in vacuo. The product of the reaction is washed several times with ether, whereby the unchanged parent material and decomposed pyridinium salt go into solution. The insoluble residue consists of the pyridinium salt. This product can be recrystallized from aqueous methanol, from methanol alone or from a mixture of methanol and ether. It is hygroscopic and melts (with decomposition) at 220–227° C.

3 parts of the pyridinium salt are sublimed in a vacuum of 0.02 mm. in a molecular distillation flask. At a bath temperature of about 200–230° C., the products of the reaction, the diene and pyridine hydrobromide pass over. They are dissolved in ether and water. The ethereal solution gives, on evaporating down, a bright yellow product which is converted by concentration of a methanol solution in vacuo, into flocks which can be filtered off cold by suction.

After recrystallizing twice, bright yellow granules are obtained which melt indefinitely above 98° C. Analysis agrees with the expected diene of the formula $C_{40}H_{50}O_4$. From the ethereal solution separated off after treatment with pyridine, the same diene can be obtained by, for example, chromatography of the residue, with removal of the unchanged starting material. When the bromination with N-bromo-succinimide is carried out in the dark, boiling is continued advantageously for ½ hour or even longer.

Instead of with pyridine, the bromide may be reacted with a carboxylic acid salt or with an alcohol or phenol and the acyloxy compound or ether obtained then may be subjected to an analogous thermal decomposition.

Before oxidation, the product should be re-acetylated. For this purpose 2 parts are dissolved in 10 parts of pyridine and allowed to stand with 6 parts of acetic anhydride for 15 hours at 20° C. The solution is then concentrated down in vacuo, the residue dissolved in ether, and the solution washed in succession with 2N hydrochloric acid, water, 2N sodium carbonate solution and water, dried with sodium sulphate and evaporated down.

10 parts of the residue obtained in this way are dissolved in chloroform and treated at 0° C. with ozone, until a drop gives no further reaction with tetranitro methane but a positive reaction on potassium iodide starch paper. The solution is then shaken with 5 parts of zinc and 5 parts of glacial acetic acid at 0° C. It is then concentrated down in vacuo, the residue dissolved in ether, the ethereal solution washed with 2N sodium carbonate solution, water, 2N hydrochloric acid and water, then dried and evaporated down. The residue consists of 9.5 parts of a mixture from which, with help of the chloride of trimethyl-ammonium-acetic acid hydrazide, 4 parts of a ketone fraction can be separated off in known way. The latter is partly saponified cold by allowing to stand for 15 hours with a solution of potash in aqueous methanol, in order to ensure better isolation of the end-product. After neutralizing the solution with acetic acid it is freed from methanol in vacuo, the residue extracted with ether and the ethereal solution washed with 2N sodium carbonate solution, water, 2N hydrochloric acid and water, dried with sodium sulphate and evaporated down. On adding a crystal of the substance to the solution, the 3α-hydroxy-12-acetoxy-pregnane-20-one, M. Pt. 207–209° C., crystallizes out immediately. A further quantity of the same product is obtained by chromatography of the mother liquors.

Example 2

10 parts of $\Delta^{23}$-3α, 12-diacetoxy-24,24-diphenyl-cholene are heated for 30 minutes in the dark on a water bath with 6 parts of N-bromo-succinimide in 50 parts of carbon tetrachloride. The residue is filtered off by suction and the filtrate evaporated down in vacuo. 60 parts of collidine or dimethylaniline are added to the residue and the solution boiled under reflux for one hour in an oil-bath. After evaporating down in vacuo, the residue is dissolved in ether and the ethereal solution washed with 2N hydrochloric acid, water, 2N sodium carbonate solution and water, dried, filtered through a layer of aluminium oxide, and evaporated down. The bright yellow residue is dissolved in 100 parts of hot methanol and the solution allowed to stand for 10 hours at 20° C. whereby two parts of the unchanged parent material crystallize out. The latter is filtered off by suction and washed with cold methanol. Part of the solvent is then evaporated off from the methanol solution in vacuo, whereby flocculent crystals of the diene gradually separate out. The latter are filtered off cold by suction and washed with ice-cold methanol. The bright yellow product obtained after recrystallizing twice melts indefinitely above 98° C. and is identical with the compound obtained by heating the pyridinium bromide as described in Example 1. For the next stage however the crude diene, obtained from the total methanol solution by completely evaporating it, is advantageously used. In addition the diene is acetylated and ozonized, as stated in Example 1, and the diacetate obtained partially saponified.

In a similar way the starting material can be chlorinated with, for example, N-chlor-2,4,6-trichlor-acetanilide or benzanilide instead of being brominated with N-bromo-succinimide, and the diene described above then be obtained from the chloride by means of collidine.

Instead of the 24,24-diphenyl compound, the corresponding 24,24-dimethyl-derivative (M. P. 88–89°) may also serve as starting material.

Instead of ozonizing the diene in the manner described it can also be split up by oxidation with chromic acid. For this purpose ⅘ of its quantity of chromic acid, dissolved in 20 times the amount of glacial acetic acid, is added, and this solution allowed to stand for 15 hours at room temperature or for a correspondingly shorter time at a higher temperature. The excess chromic acid is then decomposed with methanol, the solution evaporated down in vacuo, the residue extracted with ether, the ether solution washed with 2N sodium carbonate solution and then with water until neutral, and evaporated down. The ketone fraction is separated off from the neutral product obtained in a known manner, with the help of the chloride of pyridinium acetic acid hydrazide, and partially saponified cold, by allowing to stand for 15 hours with a solution of potash in aqueous methanol, in order to ensure better isolation of the end product. After neutralization of the solution with acetic acid, the methanol is removed in vacuo, the residue extracted with ether, the ether solution washed with 2N sodium carbonate solution and water, dried and evaporated down. The residue is recrystallized from isopropyl-ether and the 3α-hydroxy-12-acetoxy-pregnane-20-one described in Example 1 is thus obtained.

From the acid fraction removed with sodium carbonate solution after the oxidation with chromic acid there is obtained, after similar partial saponification, the 3α-hydroxy-12-acetoxy-etio-cholanic acid.

Example 3

One part of $\Delta^{5:23}$-24.24-dimethyl-choladiene-3-ol-acetate of M. P. 124–126° (which can be prepared for example from $\Delta^5$-3-hydroxy-cholenic acid methylester by reaction with methyl-magnesium-halide, partial cold acetylation of the carbinol obtained with acetic anhydride and pyridine, splitting off the tertiary hydroxyl group e. g. by reacting with phosphorus pentoxide in benzene) is dissolved in 100 parts of absolute ether and a solution of 50 parts of hydrogen chloride in 100 parts of absolute alcohol added cold. After standing for 3 days, the precipitated needles are filtered off by suction and washed with some cold methanol. 10 parts of this hydrochloride are boiled for about 20 minutes with 7.5 parts of N-bromo-succinimide in 60 parts of carbon tetrachloride.. The excess N-bromo-succinimide and the succinimide formed is filtered off by suction, washed with a little carbon tetrachloride and the filtrate evaporated down in vacuo. The residue is boiled for 1 hour under reflux with 120 parts of collidine. After evaporating the solution down in vacuo, the residue is dissolved in ether, the ether solution washed with normal sulphuric acid, water, normal sodium carbonate solution and water, dried and evaporated down. It is then dissolved in a little methanol and some unchanged starting material separated off by cooling the solution. An equal quantity of a 3N solution of potassium hydroxide in methanol is added to the methanol solution and the mixture boiled for two hours under reflux. After working up the saponification mixture in the usual way, the product, which is a crude hydroxy-triene, is dissolved in benzene or toluene and dehydrogenated in known manner by means of aluminium alcoholate or aluminium phenolate and acetone or cyclohexanone. The crude keto-triene isolated as usual is dissolved in glacial acetic acid, a solution of 4.5 mols chromic acid in 95% acetic acid added and the whole allowed to stand at room temperature for 16 hours. The excess chromic acid is decomposed by the addition of methanol, the solution is concentrated down, water is added and the whole is extracted with ether. The ethereal solution is washed with normal sodium carbonate solution, water, normal sulphuric acid solution and water, dried and evaporated down in vacuo. From the residue there is obtained progesterone by chromatography, recrystallization, by reacting with ketonic reagents such as semi-carbazide acetate or the chloride of tri-methyl-pyridinium acetic acid hydrazide, or by extracting a benzene solution with 75 per cent sulphuric acid in a known way. The progesterone crystallizes in dimorphous forms, which have melting points of 120° C. and 129° C.

Instead of dehydrogenating the hydroxyl group by the method of exchanging oxidation stages and oxidizing the double bond with chromic acid, both reactions can be carried out simultaneously with chromic acid (after temporary protection of the nuclear double bond) or one can first ozonise and then oxidise with chromic acid.

The same end-product can be obtained if, as starting material, the acetate is replaced by another ester, e. g. the benzoate, or if Δ⁴:²³-24,24-dimethyl-choladiene-3-one (prepared from the 3-hydroxy compound by dehydrogenation with aluminium isopropylate and cyclohexanone) is brominated as described, hydrogen bromide split off from the bromide, the ketotriene obtained oxidized with chromic acid and worked up as described above.

In an entirely analogous way the Δ⁴-3-keto-bisnor-cholenic acid can be obtained starting from Δ⁵-3-benzoxy-24-isopropylidene-cholene (obtained, for example, by treating Δ⁵-3-hydroxy-nor-cholestene-25-one with a Grignard reagent, elimination of water and benzoylation) or from Δ⁵-3-benzoxy-24-ethylidene-cholene (obtained, for example, by reduction of the keto group in Δ⁵-3-hydroxy-nor-cholestene-25-one, elimination of water and benzoylation).

What we claim is:

1. In a process for the degradation of the side-chain of a steroid, the steps of causing a steroid carrying in 17-position a substituent

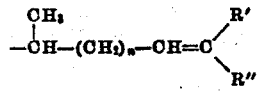

wherein R' and R'' each represents a member of the group consisting of hydrogen and lower aliphatic and lower aromatic hydrocarbon radicals, and $n$ is one of the integers 1 and 2, to react with a member of the group consisting of a carboxylic acid imide, amide and arylamide, substituted by halogen at the nitrogen atom, and subjecting the product so obtained to the action of a dehydrohalogenating agent.

2. A process for the degradation of the side-chain of a steroid, which comprises causing a steroid carrying in 17-position a substituent

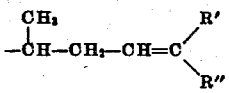

wherein R' and R'' each represents a member of the group consisting of hydrogen and lower aliphatic and lower aromatic hydrocarbon radicals, to react with a member of the group consisting of a carboxylic acid imide, amide and arylamide, substituted by halogen at the nitrogen atom, subjecting the product so obtained to the action of a dehydrohalogenating agent, and finally splitting up the newly formed conjugated double bond by means of an oxidizing agent.

3. A process for the degradation of the side-chain of a steroid, which comprises causing a steroid carrying in 17-position a substituent

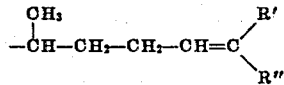

wherein R' and R'' each represents a member of the group consisting of hydrogen and lower aliphatic and lower aromatic hydrocarbon radicals, to react with a member of the group consisting of a carboxylic acid imide, amide and arylamide, substituted by halogen at the nitrogen atom, subjecting the product so obtained to the action of a dehydrohalogenating agent, and finally splitting up the newly formed conjugated double bond by means of an oxidizing agent.

4. A process for the degradation of the side-chain of a steroid, which comprises causing a steroid carrying in 17-position a substituent

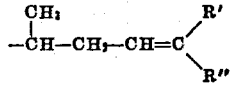

wherein R' and R'' each represents a member of the group consisting of hydrogen and lower aliphatic and lower aromatic hydrocarbon radicals, to react with a member of the group consisting of a carboxylic acid imide, amide and arylamide, substituted by halogen at the nitrogen atom, sensitive substituents being temporarily protected, subjecting the product so obtained to the action of a dehydrohalogenating agent, and finally splitting up the newly formed conjugated double bond by means of an oxidizing agent.

5. A process for the degradation of the side-chain of a steroid, which comprises causing a steroid carrying in 17-position a substituent

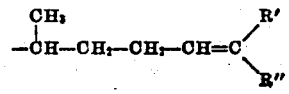

wherein R' and R'' each represents a member of the group consisting of hydrogen and lower aliphatic and lower aromatic hydrocarbon radicals, to react with a member of the group consisting of a carboxylic acid imide, amide and arylamide, substituted by halogen at the nitrogen atom, sensitive substituents being temporarily protected, subjecting the product so obtained to the action of a dehydrohalogenating agent, and finally splitting up the newly formed conjugated double bond by means of an oxidizing agent.

6. A process for the degradation of the side-chain of a steroid, which comprises causing a steroid carrying in 17-position a substituent

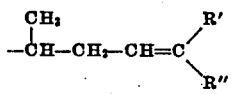

wherein R' and R'' each represents a lower aromatic hydrocarbon radical, to react with a member of the group consisting of a carboxylic acid imide, amide and arylamide, substituted by halogen at the nitrogen atom, nuclear double bonds and sensitive substituents being temporarily protected, the former by addition of hydrogen halide, subjecting the product so obtained to the action of a dehydrohalogenating agent, and finally splitting up the newly formed conjugated double bond by means of an oxidizing agent.

7. A process for the degradation of the side-chain of a steroid, which comprises causing a steroid carrying in 17-position a substituent

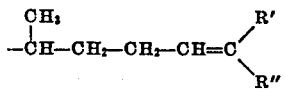

wherein R' and R'' each represents a lower aromatic hydrocarbon radical, to react with a member of the group consisting of a carboxylic acid imide, amide and arylamide, substituted by halogen at the nitrogen atom, nuclear double bonds and sensitive substituents being temporarily protected, the former by addition of hydrogen halide, subjecting the product so obtained to the action of a dehydrohalogenating agent, and finally splitting up the newly formed conjugated double bond by means of an oxidizing agent.

8. A process for the degradation of the side-chain of a steroid, which comprises causing a steroid carrying in 17-position a substituent

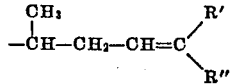

wherein R' and R'' each represents a member of the group consisting of hydrogen and lower aliphatic and lower aromatic hydrocarbon radicals, to react with N-bromo-succinimide, subjecting the product so obtained to the action of a tertiary amine, and subsequently splitting up the newly formed conjugated double bond by means of an oxidizing agent.

9. A process for the degradation of the side-chain of a steroid, which comprises causing a steroid carrying in 17-position a substituent

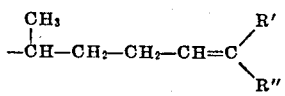

wherein R' and R'' each represents a member of the group consisting of hydrogen and lower aliphatic and lower aromatic hydrocarbon radicals, to react with N-bromo-succinimide, subjecting the product so obtained to the action of a tertiary amine, and subsequently splitting up the newly formed conjugated double bond by means of an oxidizing agent.

10. A process for the degradation of the side-chain of a steroid, which comprises causing a steroid carrying in 17-position a substituent

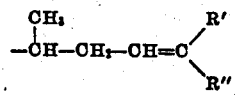

wherein R' and R'' each represents a member of the group consisting of hydrogen and lower aliphatic and lower aromatic hydrocarbon radicals, to react with N-bromo-succinimide, subjecting the product so obtained to the action of a tertiary amine, and subsequently splitting up the newly formed conjugated double bond by means of chromium trioxide.

11. A process for the degradation of the side-chain of a steroid, which comprises causing a steroid carrying in 17-position a substituent

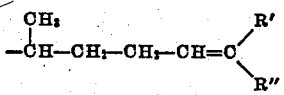

wherein R' and R'' each represents a member of the group consisting of hydrogen and lower aliphatic and lower aromatic hydrocarbon radicals, to react with N-bromo-succinimide, subjecting the product so obtained to the action of a tertiary amine, and subsequently splitting up the newly formed conjugated double bond by means of chromium trioxide.

12. A process for the degradation of the side-chain of a steroid, which comprises causing a steroid carrying in 17-position a substituent

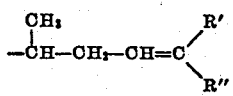

wherein R' and R'' each represents a member of the group consisting of hydrogen and lower aliphatic and lower aromatic hydrocarbon radicals, to react with N-bromo-succinimide in the dark, subjecting the product so obtained to the action of a tertiary amine, and subsequently splitting up the newly formed conjugated double bond by means of chromium trioxide.

13. A process for the degradation of the side-chain of a steroid, which comprises causing a steroid carrying in 17-position a substituent

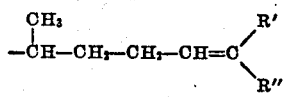

wherein R' and R'' each represents a member of the group consisting of hydrogen and lower aliphatic and lower aromatic hydrocarbon radicals, to react with N-bromo-succinimide in the dark, subjecting the product so obtained to the action of a tertiary amine, and subsequently splitting up the newly formed conjugated double bond by means of chomium trioxide.

14. A process for the degradation of the side-chain of a steroid, which comprises causing a steroid carrying in 17-position a substituent

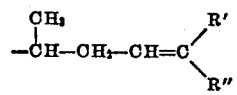

wherein R' and R'' each represents a member of the group consisting of hydrogen and lower aliphatic and lower aromatic hydrocarbon radicals, to react with a member of the group consisting of a carboxylic acid imide, amide and arylamide, substituted by halogen at the nitrogen atom, subjecting the product so obtained to the action of a dehydrohalogenating agent and then to a thermal decomposition, and finally splitting up the newly formed conjugated double bond by means of an oxidizing agent.

15. A process for the degradation of the side-chain of a steroid, which comprises causing a steroid carrying in 17-position a substituent

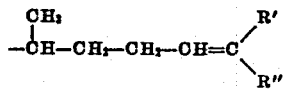

wherein R' and R'' each represents a member of the group consisting of hydrogen and lower aliphatic and lower aromatic hydrocarbon radicals, to react with a member of the group consisting of a carboxylic acid imide, amide and arylamide, substitued by halogen at the nitrogen atom, subjecting the product so obtained to the action of a dehydrohalogenating agent and then to a thermal decomposition, and finally splitting up the newly formed conjugated double bond by means of an oxidizing agent.

16. A process according to claim 2, wherein the splitting up of the double bond is effected with the additional step of converting nuclear hydroxyl groups into keto groups by the method of exchanging oxidation stages.

17. A process according to claim 3, wherein the splitting up of the double bond is effected with the additional step of converting nuclear hydroxyl groups into keto groups by the method of exchanging oxidation stages.

18. A process according to claim 2, wherein the splitting up of the conjugated double bond is effected with the additional step of converting nuclear hydroxyl groups into keto groups by the action of a member of the group consisting of oxidizing and dehydrogenating agents.

19. A process according to claim 3, wherein the plitting up of the conjugated duoble bond is effected with the additional step of converting nuclear hydroxyl groups into keto groups by the action of a member of the group consisting of oxidizing and dehydrogenating agents.

20. A process for the degradation of the side-chain of a steroid, which comprises causing a steroid carrying in 17-position a substituent

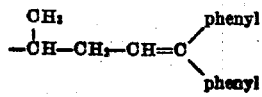

to react with N-bromo-succinimide, subjecting the product so obtained to the action of a tertiary amine, and subsequently splitting up the newly formed conjugated double bond by means of an oxidizing agent.

21. A process for the degradation of the side-chain of a steriod, which comprises causing a steroid carrying in 17-position a substituent

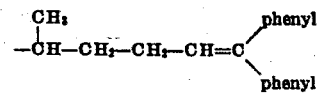

to react with N-bromo-succinimide, subjecting the product so obtained to the action of a tertiary amine, and subsequently splitting up the newly formed conjugated double bond by means of an oxidizing agent.

22. A 10,13-dimethyl-cyclopentanopolyhydrophenanthrene carrying in 17-position a substituent of the formula.

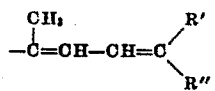

wherein R' and R'' each represents a member of the group consisting of hydrogen and lower aliphatic and lower aromatic hydrocarbon radicals.

23. A 10,13-dimethyl-cyclopentanopolyhydrophenanthrene containing in 17-position a substituent of the formula

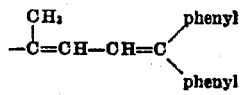

CHARLES MEYSTRE.
ALBERT WETTSTEIN.
KARL MIESCHER.
HUGO FREY.

REFERENCES CITED

The following references are of record in the file of this patent:

FOREIGN PATENTS

| Number | Country | Date |
|---|---|---|
| 544,051 | Great Britain | Mar. 25, 1942 |

Certificate of Correction

Patent No. 2,461,563. February 15, 1949.

KARL MIESCHER ET AL.

It is hereby certified that errors appear in the printed specification of the above numbered patent requiring correction as follows:

Column 2, line 9, and column 12, line 7, claim 21, for "steriod" read *steroid*; column 4, lines 14 and 15, for "exidation" read *oxidation*; line 31, for "saparated" read *separated*; column 11, line 22, claim 15, for "substitued" read *substituted*; line 45, claim 19, for "duoble" read *double*;

and that the said Letters Patent should be read with these corrections therein that the same may conform to the record of the case in the Patent Office.

Signed and sealed this 16th day of August, A. D. 1949.

[SEAL]

THOMAS F. MURPHY,
*Assistant Commissioner of Patents.*